United States Patent [19]
Blessing

[11] Patent Number: 5,263,799
[45] Date of Patent: Nov. 23, 1993

[54] THREADING APPARATUS

[75] Inventor: Matthias Blessing, Ostfildern, Fed. Rep. of Germany

[73] Assignee: Otto Bilz, Werkzeugfabrik GmbH & Co., Fed. Rep. of Germany

[21] Appl. No.: 841,348

[22] Filed: Feb. 25, 1992

[30] Foreign Application Priority Data

Apr. 17, 1991 [DE] Fed. Rep. of Germany ....... 4112467

[51] Int. Cl.$^5$ ................................................. B23G 3/02
[52] U.S. Cl. ...................................... 408/139; 192/51; 408/141
[58] Field of Search ........................ 408/139, 141, 142; 192/21, 44, 45, 51

[56] References Cited

U.S. PATENT DOCUMENTS

| | | | |
|---|---|---|---|
| 3,946,844 | 3/1976 | Johnson | 192/21 X |
| 4,277,209 | 7/1981 | Benjamin et al. | 408/139 |
| 4,705,437 | 11/1987 | Johnson | 192/21 X |
| 4,832,542 | 5/1989 | Johnson et al. | 408/142 X |

Primary Examiner—Steven C. Bishop
Attorney, Agent, or Firm—Michael J. Striker

[57] ABSTRACT

A threading apparatus has a rotatable and axially movable driving part, a driven part which is axially displaceable relative to the driving part and adapted for driving a threading tool, a switchable form-locking coupling device including a switching member connected with the driven part and provided with coupling members and at least one coupling part driven by the driving part and having coupling elements. The driven part with the switching member and the at least one coupling part are axially relatively displaceable so that the at least one coupling part with the coupling elements is positionable with the coupling members in form-locking coupling engagement with the driven part or in a not driven intermediate position. The switching member is connected with the driven part in an axially not-displaceable manner and coupled form-lockingly in a circumferential direction and drives the driven part. The switching member is provided on its outer side with substantially axes-parallel grooves in which the coupling members are received axially movably and form-lockingly in a circumferential direction.

36 Claims, 4 Drawing Sheets

THREADING APPARATUS

BACKGROUND OF THE INVENTION

The present invention relates to a threading apparatus.

Threading apparatuses are widely known. In a known threading apparatus the switchable, form-locking coupling device is formed as a claw coupling. This construction as well as other structural elements have the disadvantage that the coupling device is subjected to high wear. This is especially true for threading apparatuses with or without rotary direction reverse transmission for threading with high rotary speeds and without rotary direction change of the driving machine spindle driven with high rotary speed, for example in the range of 2,500 revolutions per minute. All torque-transmitting structural elements must satisfy high requirements. During cutting of a right-handed thread, for example, the coupling devices switch so that the first coupling part is connected with a switching member and thereby with the driving part coupled with the switching member in a torque-transmitting connection. In contrast, the second coupling part is not coupled with the switching member. A rotary direction change to left-handed, for example, for turning out of the tap is performed by the axial displacement of the switching member and uncoupling of the first coupling part and coupling of the second coupling part. In this case there is high rotary speed difference, and therefore a high acceleration is produced. As a result there is a problem to provide a wear-free coupling of the switching member with the second coupling part and also to transmit the high rotary speed differences and thereby require accelerations so as to maintain the wear of the individual part as low as possible. The first goal is achieved in the threading apparatus in that during drilling of threaded openings a maximum accurate thread depth is achievable and it is worked at the above mentioned high rotary speeds.

SUMMARY OF THE INVENTION

Accordingly, it is an object of the present invention to provide a threading apparatus of the above mentioned general type, which avoids the disadvantages of the prior art.

More particularly, it is an object of the present invention to provide a threading apparatus which is simple, cost-favorable and space-saving as well as operationally reliable, and also provides for a wear-free and minimally jerky coupling.

In keeping with these objects and with others which will become apparent hereinafter, one feature of the present invention resides, briefly stated, in a threading apparatus in which a switching member is connected with a driven part in an axially non-displaceable manner and coupled form-lockingly in a circumferential direction and drives the driven part and the switching member at its outer side has substantially axis-parallel grooves for receiving coupling members in axially movable and circumferentially form-locking manner.

When the apparatus is designed in accordance with the present invention it avoids the disadvantages of the prior art and achieves the above mentioned objects. It is to be understood that the threading apparatus with the above features can be also designed without rotary direction reversing transmission. In this case, after threading the thread is uncoupled by the coupling device so that the machine spindle after braking and machine-side rotary direction reverse can be driven in the opposite direction, while through the coupling device the uncoupling and then the coupling for the opposite-direction driving is performed.

In accordance with another feature of the present invention a driving part drives a rotary direction reversing transmission connected with a driving portion of the first coupling part and an outlet of the second coupling part. In this construction after threading the thread and for withdrawing the tap the rotary direction of the machine spindle can be maintained.

In accordance with still a further feature of the present invention, the threading apparatus does not have rotary direction reversing transmission and has only one coupling part in which during coupling of the coupling device its coupling members engage. After threading the thread is uncoupled through the coupling device by pulling back of the machine spindle so that the machine spindle can be braked and at the machine-side its rotary direction can be reversed, and then the machine spindle can be rotated in the opposite direction. For this purpose the coupling device is again positioned into coupling engagement, and during the opposite rotation of the machine spindle the tap is withdrawn. With this construction the threaded apparatus is simpler. It has only one coupling part.

In the apparatus in accordance with the present invention a maximum wear-free coupling under load, as well as uncoupling and coupling, is obtained, the loading of the individual structural parts is substantially reduced, and their service life is considerably increased. The threading apparatus of the invention makes possible to obtain relatively accurate thread depths during drilling of threaded openings and with the desired high rotary speed for example in the order of 2,500 revolutions per minute. The individual coupling members are elastically absorbed, so that they can deviate during coupling axially and elastically until the form-locking connection for transmission of the torque is produced. Due to the damping device between the switching member and the driven part a further wear reduction is obtained since during load change the damping device can dampen impacts and thereby allow a further coupling. This is true both in the turning-in direction as well as in the turning-out direction.

Furthermore, the mass to be accelerated is subdivided into two partial masses from which the small partial mass is composed of the switching member and the coupling member, while the greater partial mass includes the driven part, especially the spindle, with drivers for coupling the drivers of the switching member and also with elements in the region of the receptacle for clamping and/or exchanging the tools, especially the taps, such as for example a chuck, a clamping jaw, a quick exchange insert, etc. During directional changes only small mass must be accelerated with low acceleration path which lies in the region of the elasticity of the respective coupling members and can be absorbed. The other greater partial mass to be accelerated is to the contrary softly accelerated through the damping device with long acceleration path so that the acceleration is dampened.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
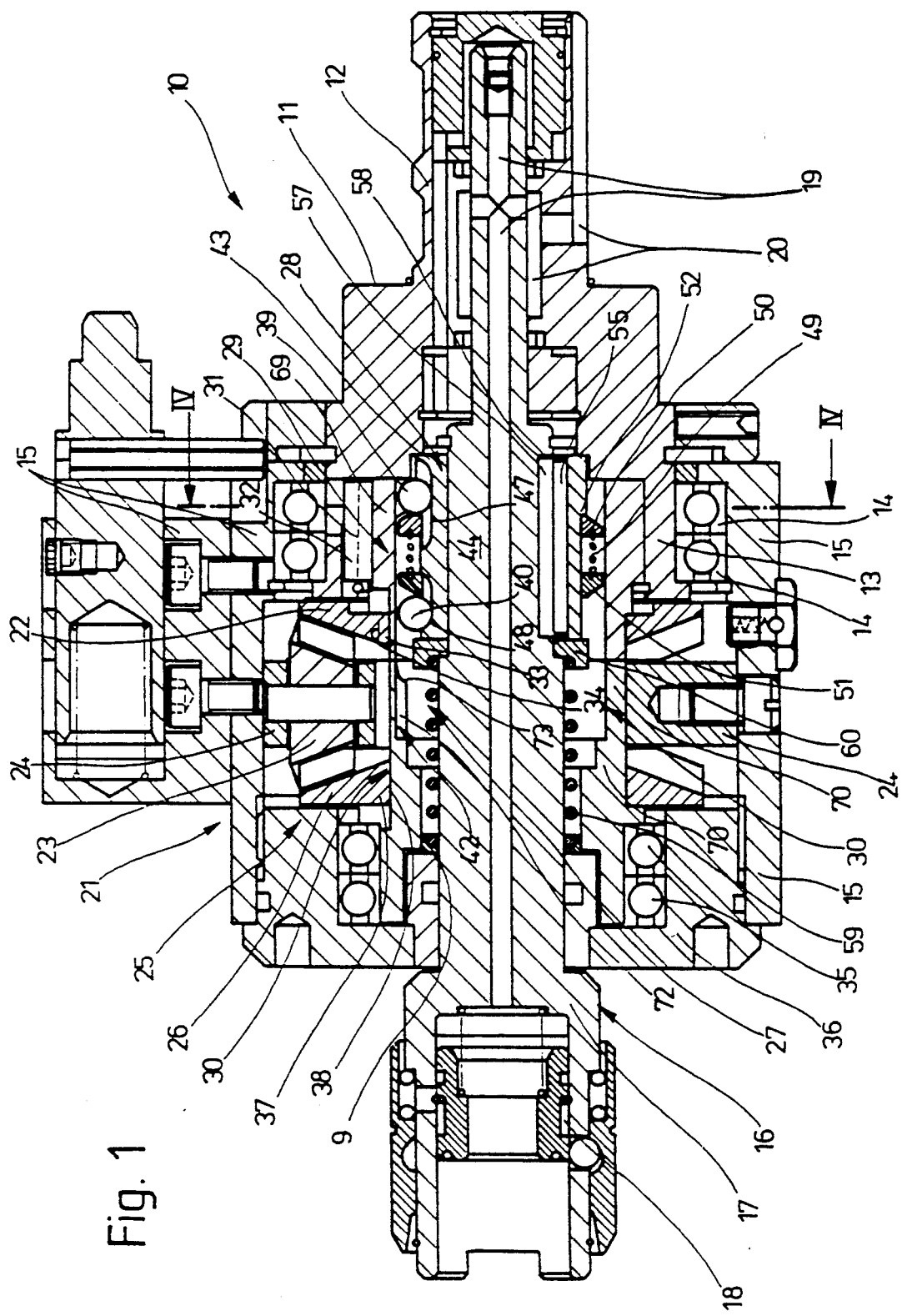
FIG. 1 is a view showing schematically an axial longitudinal section of the threading apparatus in a coupled position for threading a right-handed thread.

A threading apparatus is identified as a whole with reference numeral 10 and has a driving part which is continuously rotatable by a not shown machine spindle of a power tool and is axially displaceable. The driving part 11 has a shaft 12 with a cylindrical housing portion 13 connected with it and rotatably supported by bearings 14 in a housing 15 which is held at the machine side. A coupling part for inserting the not shown machine spindle is mountable on the shaft 12 and can be formed as an adjusting sleeve, a cone or the like.

The threading apparatus 10 further has a driven part 16 which is axially displaceable relative to the driving part 11. The driven part 16 has a spindle 17 which centrally extends in the threading apparatus approximately over its whole length and at the end facing away of the not shown machine spindle projects axially outwardly beyond the threading apparatus. At that end it has a receptacle 18, for example for a clamping chuck for direct or indirect receipt of a not shown tap. The driven part 16 has passages 19 which communicate with passages 20 provided in the driving part 11 for supplying a cooling and lubricating medium for the inner cooling of the tap.

The threading apparatus 10 further has a rotary direction reversing transmission 21 driven by the driving part 11. The rotary direction reversing transmission 21 includes a bevel gear 22 which is connected with the driving part 11 for joint rotation with it and is driven by the driving part. The bevel gear 22 engages with for example three bevel gears 23 which are spaced from one another in equal angular distances in the circumferential direction and rotatably supported in a ring 24. The ring 24 is fixedly mounted in the housing 15 and not rotated, so that when for example the bevel gear 22 is driven in the right direction the three bevel gears 23 are driven rotatable about their longitudinal axes. The rotary direction reversing transmission 21 also has an outlet 25 formed as a bevel gear 26 which engages with the three bevel gears 23. The bevel gear 26 is coaxial to the bevel gear 22 and is located opposite to the latter. When the bevel gear 22 rotates to the right, rotary direction reverse is obtained through the bevel gears 23 with the other bevel gear 26 driven over them. The bevel gear 26 during rotation of the bevel gear 22 to the right rotates in opposite direction.

A switchable form-locking coupling device 27 is provided in the threading apparatus. It includes a switching member 28 connected with the driven part 16 in form of the spindle 17 and driving the latter. The coupling device 27 also has a coupling part 29 which is driven by the driving part 11 and especially its housing part 13, and a further coupling part 30 which is connected with the output 25 and in particular bevel gear 26 of the rotary direction reversing transmission 21. The first coupling part 29 is located in the housing part 13 and provided on its outer side for example with an axis-parallel groove 31 for form-lockingly engaging with a corresponding projection 32 in the interior of the housing part 13 so as to transmit the torque. The projection 32 can be formed on the housing part 13 or on an adjusting spring arranged in a groove of the housing part 13. The bevel gear 22 is centered on the first coupling part 29 and connected with it in a rotation-transmitting manner. The connection can be performed for example by radially inwardly directed projection 33 provided on the bevel gear 22 and form-lockingly engaging in an axes-parallel groove 34 of the first coupling part 29.

The second coupling part 30 is rotatably supported in a housing cover 36 by a bearing 35. On its outer surface the output 25 in form of the bevel gear 26 is centered. It engages for example by means of a radial projection 37 in an axes-parallel groove 38 of the second coupling part 30 and therefore is non-rotatably connected with it. As a result the bevel gear 36 and the second coupling part 30 perform the same driving movement, or in other words rotate oppositely when the driving part 11 rotates to the right.

Figure 2:
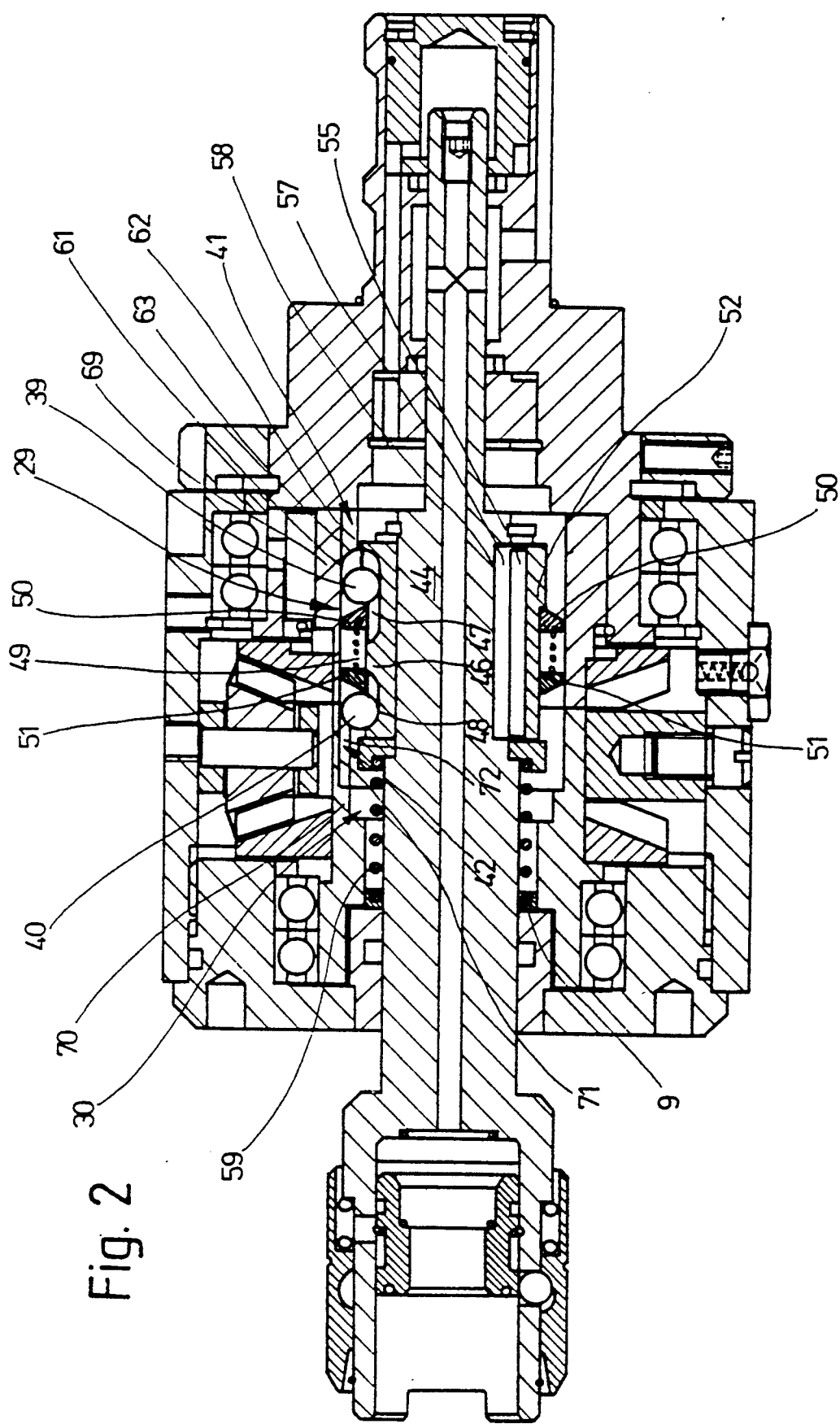
FIG. 2 is a view schematically showing an axial longitudinal section of the threading apparatus corresponding to FIG. 1 with the apparatus in a not coupled intermediate position.
Figure 3:
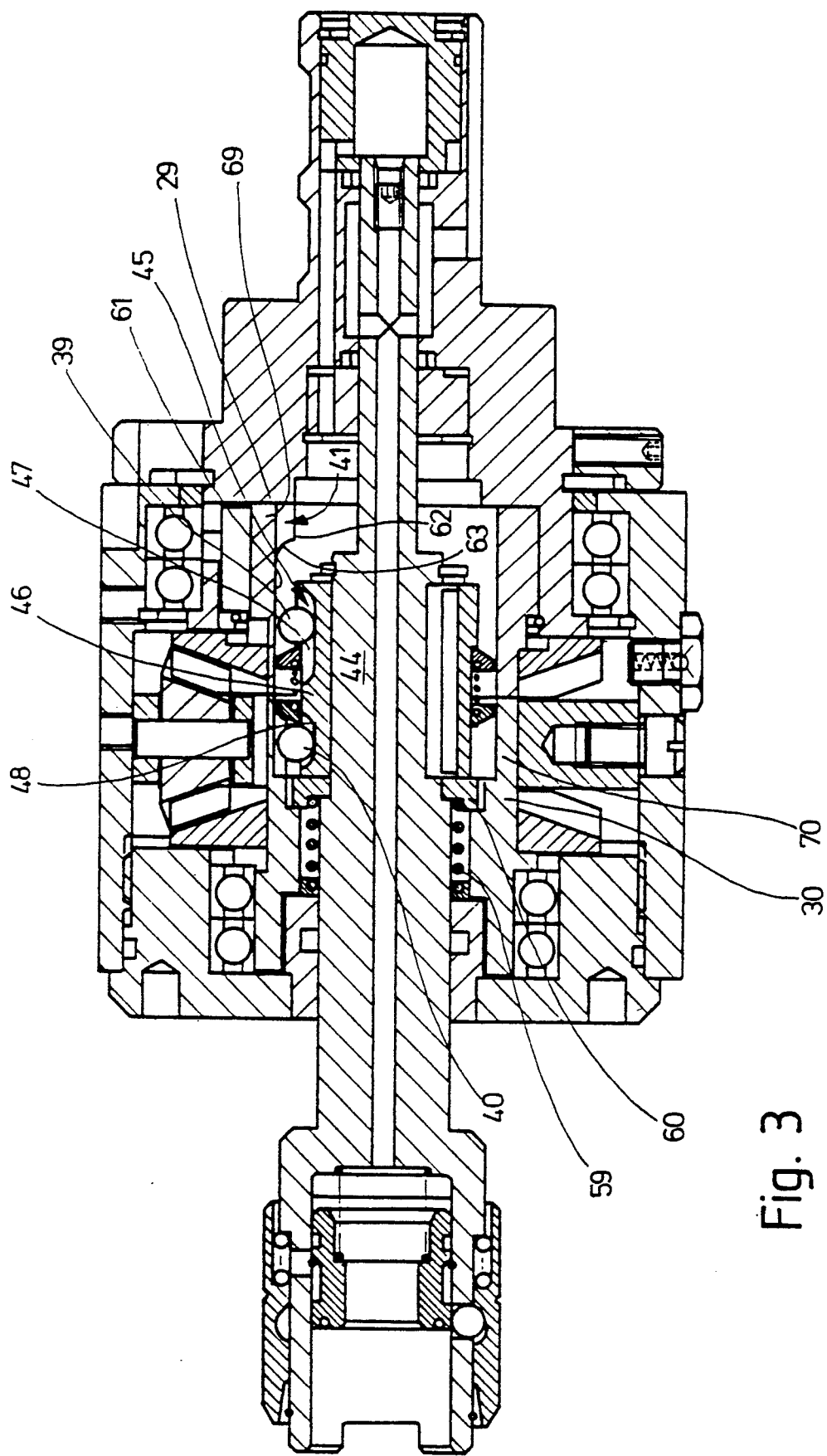
FIG. 3 is a view schematically showing an axial longitudinal section of the threading apparatus of FIG. 1 in another coupled position for turning-out of a tap for a left-handed thread.

Due to the axial relative displacement between the driven part 16 or the spindle 17 with the switching member 28 on the one hand, and the coupling parts 29, 30 on the other hand, the first coupling part 29 as shown in FIG. 1 or instead of it the second coupling part 30 as shown in FIG. 3 are positionable in engagement with the switching member 28 or instead adjustable to a not driving intermediate position shown in FIG. 2.

The coupling member 28 has coupling bodies 39 and 40 which are held in it in form-locking manner and guided by it. The locking members 39 and 40 are selectively positionable into engagement with the associated coupling elements 41 or 42 on the first coupling part 29 or the second coupling part 30 to provide a form-locking coupling engagement or to provide an intermediate position located between them. The coupling bodies 39 and 40 are formed here as balls. The whole coupling device 27 is formed as a ball coupling.

The switching member 28 is arranged coaxially to both coupling parts 29 and 30 and axially between these coupling parts, so that the switching member 28 in one relative position of the driven part 16 and in particular the spindle 17 is in an axial position in engagement with the first coupling part 29 as shown in FIG. 1, and in another axial relative position of the driven part 16 in particular the spindle 17 is in another opposite axial position in engagement with the second coupling 30 as shown in FIG. 3. The switching member 28 is formed as a cylindrical sleeve 43 which is centered on an outlet 44 of the spindle 17. The cylindrical sleeve 43 is provided at its outer side with for example three axes-parallel grooves 45 which are spaced from one another by substantially uniform circumferential distances as shown in FIG. 1. The grooves are separated from one another, by a projection 46 formed of one piece with the cylindrical sleeve 43, into two groove portions 47 and 48 which are separate from one another. In a not shown embodiment a coupling member for example a ball, is form-lockingly and movably received in each groove 45 and projects with a spherical part beyond the outer side of the switching member 28 in particular the cylindrical sleeve 43.

In the shown embodiment two coupling members 39 and 40, in particular both, are received form-lockingly and movably in each groove 45. They project with their spherical portion beyond the outer side of the switching member 28 in particular the cylindrical sleeve 43 and arranged so that the ball 39 is held in the groove portion 47 and the ball 40 is held in the groove portion 48. The balls 39 and 40 are axially spaced in the groove 45. The three coupling members 39, in particular both, are provided as switching-on balls and associated with the first coupling part 29. They are positionable in form-locking engagement with the first coupling part 29 a shown in FIG. 1 and also positionable out of the engagement.

The three other coupling members 40, in particular balls, are formed as turning-out balls and associated with the second coupling part 30 to be positionable in form-locking engagement with it or out of engagement with it.

In the axial region between the ball groups 39 and 40 a spring 49 surrounds the switching member 28 and is formed for example as a cylindrical helical spring. The spring 49 loads both ball groups 39 and 40 in a substantially axes-parallel direction from one another in a spring-elastic manner. Each ball group 39, 40 is associated with a ring 50 or 51 on the switching member 28. The ring 50 and 51 is pressed by means of the spring 49 against the respective balls 39 and 40 and is inclined on the side associated with a respective ball 39 and 40 from inside outwardly.

The ring 50 which is associated with the turning-in ball 39 is supported in a form-locking manner on a radial projection 52 formed for example as a radial shoulder of the ball sleeve 43 and therefore depending on the position of the turning-in ball 39 inside the associated groove portion 37 at an axial distance from the turning-in ball 39. In the position shown in FIG. 1, the ring 50 abuts against its radial projection 52 in form-locking manner so that the turning-in ball 39 for example is not under the loading of the spring 49.

In the shown embodiment each groove 45 is subdivided by the projection 46 into two groove portions 47 and 48. It is understood that in accordance with another not shown embodiment the groove 45 can extend continuously in the axial direction and two coupling members 39 or 40 can be arranged in the continuous groove 45. In the shown embodiment each coupling member 39 and 40 formed in particular as a ball is located in the same longitudinal groove in form of the groove portion 47 or 48. Each groove portion 47 or 48 has a greater axial size than the diameter of the ball 39 or 40.

The groove portion 47 in which the turning-in ball 39 is arranged has the axial dimension which 2-3, for example 2.5 times greater than the diameter of the ball 39. The groove 48 in which the turning-out ball 40 is located has an axial size which is approximately by 1-2 times, for example 1.5 times, greater than the diameter of the ball 40. In this way the balls 39 and 40 can move in an axial direction in the associated groove portion 47 and 48.

Figure 4:
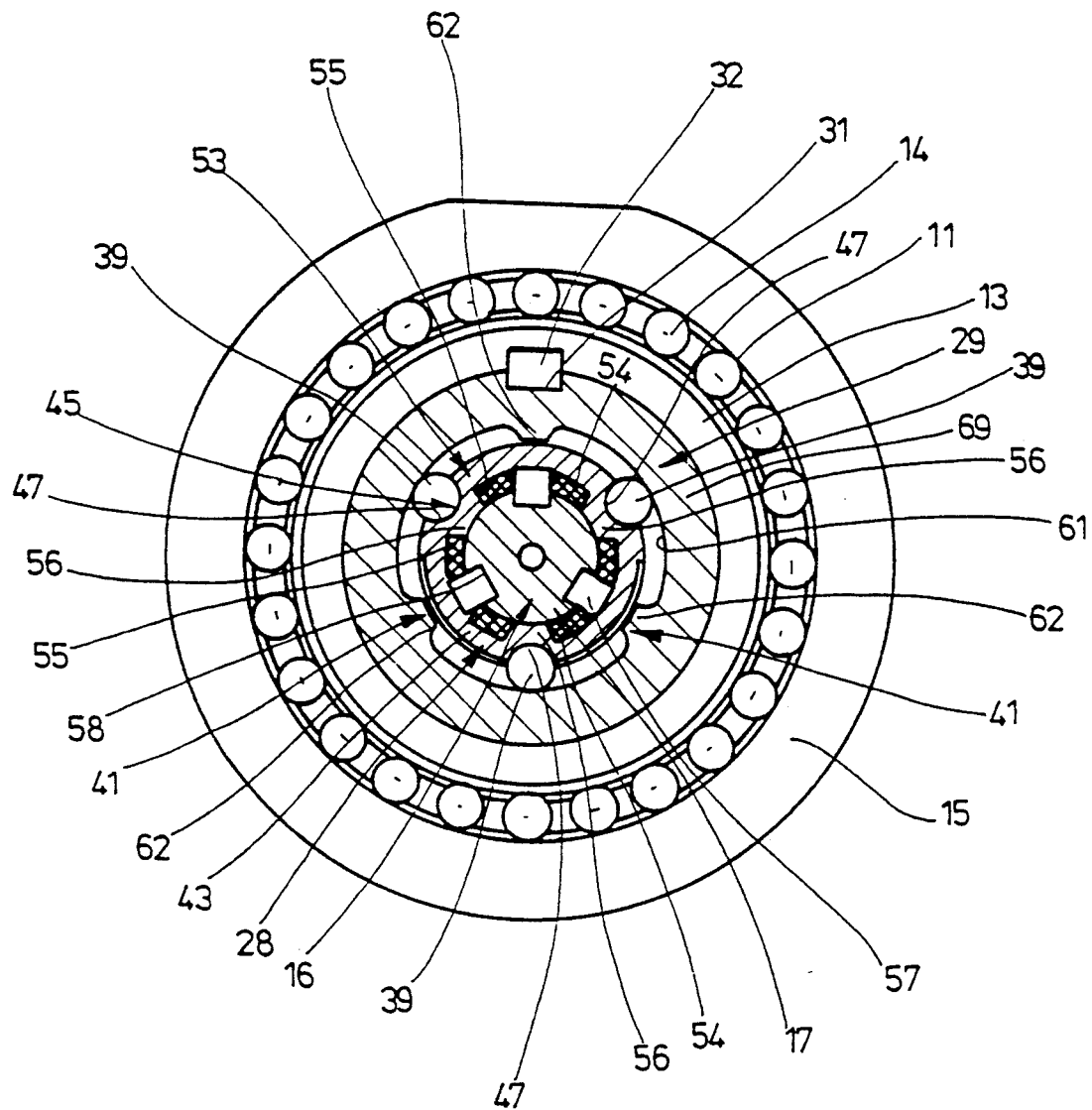
FIG. 4 is a view schematically showing a section taken along the line IV—IV in FIG. 1.

The switching member 28 formed as the cylindrical sleeve 43 is centered on the driven part 16 formed as a spindle 17 and form-lockingly coupled with the same in the circumferential direction. This form-locking coupling in the circumferential direction is provided with a damping device 53 which has a chamfer 54 spring-biasing in the circumferential direction and formed for example as spring biasing spring elements 55. The damping device 53 is located between the switching member 28 formed as a cylindrical sleeve 43 and the driven part 16 formed as the spindle 17 and is spring elastic preferably in both rotary directions. The spring element 55 can be composed for example of an elastomeric material or another elastic material which for example is wear-resistant and has a high elasticity, is not embrittled, and for example compatible with lubricants. In the shown embodiment of FIG. 4, the spring elements 55 are formed as webs, strips, stripes or other inserts. They are arranged in the circumferential direction between drivers 56 of the switching member 28 formed as the spherical sleeve 23 on the one hand and drivers 57 of the driven part 16 formed as the spindle 17 on the other hand.

The drivers 56 of the switching member 28 formed as the cylindrical sleeve 43 include radial projections, for example strips, webs, adjusting keys and the like which radially project on the inner surface of the switching member 28. Correspondingly the drivers 57 of the driven part 16 formed as the spindle 17 can be formed so that they project over the outer surface of the spindle 17 radially outwardly. In the shown embodiment the drivers 57 are formed as keys which are engaged in the grooves 58 of the spindle 17. As a result the intermediate region in the circumferential direction between the drivers 56 and 57 is available for completely filling with respective spring elements 55. The damping device 53 dampens the torque-transmitting action between the switching member 28 and the driven part 16 formed as the spindle 17, in both rotary directions. It is clear that the switching member 28 is not a one-piece component of the spindle 17, but instead is coupled through the damping device 53 in the circumferential direction with the spindle 17. In this manner the mass to be accelerated is subdivided into two partial masses. The smaller partial mass is composed of the switching member 28 with the balls 39 and 40 while the greater partial mass is composed of the spindle 17 with its drivers 57 in form of the keys and further of the further elements arranged in the receptacle 18. Such elements can be formed as a clamping chuck mounted in the receptacle 18 and the tap held directly in the clamping chuck or through a quick exchange insert. The damping device 53 makes possible to accelerate the above described greater partial mass through the damping device 53 with greater acceleration and relatively softly in one or another direction and therefore to dampen the same.

An axial return spring 59 is arranged in the interior of the second coupling part 30. With its left end in FIG. 1, it is axially supported on a rotating support part 9 and with its another end axially abuts against an abutment 60 of the driven part 16 formed as the spindle 17 or the switching member 28. The driven part 16 formed as the spindle 17 with the switching member 28 move against the action of the return spring 59 from the first coupling part 29 in direction to the second coupling part 30. By means of the return spring 59 it is returnable in the opposite direction to the position shown in FIG. 1. The return spring 59 includes for example a cylindrical helical spring which surrounds the spindle 17.

The first coupling part 29 is formed as a cylindrical sleeve 69 which engages around the switching member 28 formed as the cylindrical sleeve 43. The cylindrical sleeve 69 forms on its inner circumferential surface 61 an abutment and rolling-off surface for the turning-in balls 29 located in its interior. The axial length of the cylindrical sleeve 69 corresponds substantially to the axial length of the switching member 28 formed as the cylindrical sleeve 43. The coupling elements 41 which are associated with the balls 39 are formed as drivers 62 which are provided on the first coupling part 29 and are positionable into a form-locking, circumferentially driving engagement with the ball 39 or withdrawable from the engagement. The drivers 62 are formed as radially inwardly projecting strips, webs or other switching cams. The drivers 62 are arranged on the end region of the first coupling part 29 which faces away of the second coupling part 30, or the right end region in FIG. 1. The drivers 62 are connected with the one end of the first coupling part 29 or the right end in FIG. 1, and extend in direction toward the second coupling part 30 over a short axial length which for example substantially corresponds to the diameter of the driving-in balls 39. The axial edge 63 of each driver which faces the second coupling part 30, is curved somewhat concavely and extends outwardly to the inner peripheral surface 61 in an arcuate manner. This curvature of the edge 63 is of special advantage for the axial running-in and running-out of the associated turning-in ball 39.

The second coupling part 30 is formed as a cylindrical sleeve 70 which is freely rotatably supported in the housing cover by the bearing 35 and coupled with the output 25 in form of the bevel gear 26. The thusly designed second coupling part 30 has at least over its one axial part a stepped inner circumferential surface 71 which forms an abutment rolling-off surface for the associated turning-out balls 40. The second coupling part 30 in form of the cylindrical sleeve 70 has coupling elements 42 formed as drivers 72 which are positionable in a form-locking, circumferentially driving engagement with the turning-out balls 40 and out of the engagement. The drivers 72 can be formed as radially inwardly projecting strips, webs or other switching cams. The drivers 72 are arranged on the end region of the second coupling part 30 facing the first coupling part 29, or in other words at the right end of the second coupling part 30 in FIG. 1. The drivers 72 are at least substantially connected with this end of the second coupling part 30.

FIG. 1 shows a small axial distance between the right end of the drivers 72 and the end of the second coupling part 30. The drivers 72 extend in the direction facing away from the first coupling part 29, however over a short axial length which substantially correspond for example to the diameter of the turning-off balls 40 or as shown is greater than this diameter. The end edge 73 of each driver 72 which faces the first coupling part 29 is substantially concavely curved. It runs in the inner circumferential surface 71 of the second coupling part 30 substantially arcuately. This arcuate running of the edge 73 of the driver 72 has a special advantage in that due to it the coupling-in and uncoupling of the turning-out balls 40 and the associated drivers 72 is facilitated and accelerated. Simultaneously the wear is reduced.

The first coupling part 29 and the second coupling part 49 are arranged in axial alignment with one another. The inner circumferential surfaces 61 and 71 which form the respective abutment and rolling off surfaces for the associated balls 39 and 40 runs substantially coaxially with one another. The drivers 62 or 72 run, as considered in the radial section, in the foot region on both sides concavely and therefore arcuately out, and into the inner circumferential surfaces 61 or 71 that contribute to the wear reduction.

The operation of the threading apparatus 10 is explained hereinbelow. The switching position of the coupling device 27 shown in FIG. 1 corresponds to a condition in which the driving part 11 is rotatably driven by the not shown machine spindle of the power tool in right direction and simultaneously performs a displacement from right to left in an axial direction of FIG. 1. Thereby a thread is cut in a workpiece by means of a not shown tap which is rotatably driven in the right direction. The drive moment in the right direction is transmitted from the driving part 11 formed at the housing part 17, through the projection 32 to the first coupling 29 formed as a cylindrical sleeve 69. The coupling element 41 formed as the radially inwardly projecting driver 62 is in a form-locking engagement with the coupling member 39 formed as turning-in balls. Through the balls 39 which are form-lockingly held in the groove or portion 47, the drive moment is transferred to the switching member 27 and from it through its drivers 56 and the damping device 53 to the drivers 57, and through the latter to the driven part 16 formed as the spindle 17. Thereby the tap is driven in the right direction and for the displacement.

In a predetermined time before reaching the borehole end the displacement is switched off by the machine. The drive rotary movement is maintained unchanged, and a drive for example with a spindle rotary speed in the order of for example 2,000 revolutions per minute is performed. With the stopped displacement the thread drill is screwed further into the borehole, whereby the driven part 16 formed as the spindle 17 is pulled axially to the left in FIG. 1 relative to the locally stationary driving part 11 formed as the housing part 13. The switching member 28 which is axially fixed with the spindle 17 is also pulled to the left. Therefore the ball 39 roll between the groove portion 47 and the inner circumferential surface 61 of the first coupling part 29, and complete a movement in FIG. 1 to the left against the ring 50 and against the action of the spring 49. After pulling out of the spindle 17 by the diameter of the balls 39, for example 5 mm, each ball 39 is moved by rolling off to the left in FIG. 1 by the half ball diameter or in other words by 2.5 mm. Thereby a free space is produced before the switching edge 63 of each driver 62, and it correspond to the diameter of the balls 39. It can be seen that each ball 39 rolls with low rolling friction until the switching edge 63 from which it deviates in an impact manner and strikes to the left in FIG. 1 when the switching edge 63 is located right of the ball center point of the balls 39. Due to the impact-like deviation of the balls 39 by means of the switching edges 63, the balls 39 can move into the above mentioned free space without causing a residual torque or a wear. With this movement of the balls 39 in the free space, the driving moment of the first coupling part 29 on the switching member 28 formed as the cylindrical sleeve 43 and from it to the spindle 17 is interrupted in a springy and impact-like manner. The rotary drive in the right direction for the tap is stopped. Simultaneously the rotary direction reversing transmission 21 runs in the above described direction further unchanged, since the driving rotation of the machine in the right direction is maintained unchanged. During pulling out of the spindle 17 to the left in FIG. 1 the return spring 59 is compressed to a corresponding size and further stressed.

Then an axial movement in direction of the pulling out of the tap from the borehole which is opposite to the displacement movement, can be performed by the machine. The spindle 17 is pulled out against the action of the return spring 59 further, until the second coupling member 30 formed as turning-out balls move over the edges 73 in form-locking engagement with the driver 72 of the second coupling part 30 formed as the cylinder sleeve 70. When the form-locking engagement is not performed, the balls 40 are deviated at the edges 73 of the drivers 72 against the action of the spring 49. This deviation is performed with the axial springing til the balls 30 are spring-biased over their ball centers in the region of the drivers 72 and are form-lockingly driven by them. Since the second coupling part 30 driven from the output 25 formed as the bevel gear 26 rotates opposite to the driving rotary direction or in other words, left-handed, the spindle 7 is driven in left running during coupling of the switching member 28 with the second coupling part 30. With the engagement of the balls 40 and coupling-in in the second coupling part 30 a greater acceleration occurs due to greater rotary speed difference. Here the damping device 53 acts in a favorable manner. A wear or a plastic deformation between the balls 30, the associated groove portion 48 of the switching member 28 and the drivers 56 on the switching member 28 are avoided since the damping device 53 acts dampingly in the circumferential direction. In this coupled-in condition of the balls 40 in the second coupling part 30 the tap is rotated to the left and withdrawn from the borehole. When the tap is withdrawn from the borehole, the spindle 17 is free, so that the return spring 59 can displace the spindle 17 again to the right in FIG. 1 to the initial position in the housing part 13. The ball 40 is engaged from the driver 72 of the second coupling part 30. The other ball 39 can again be slightly springed out axially due to their soft springing and their small mass, from the associated driver 62 and in particular their switching edge 63 for coupling in.

It will be understood that each of the elements described above, or two or more together, may also find a useful application in other types of constructions differing from the types described above.

While the invention has been illustrated and described as embodied in a threading apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A threading apparatus, comprising a rotatable and axially movable driving part; a driven part which is axially displaceable relative to said driving part and adapted for driving a threading tool; a switchable form-locking coupling device including a switching member connected with said driven part and provided with coupling members and at least one coupling part driven by said driving part and having coupling elements, said driven part with said switching member and said at least one coupling part being axially relatively displaceable so that said at least one coupling part with said coupling elements is positionable with said coupling members in form-locking coupling engagement with said driven part or in a not driven intermediate position, said switching member being connected with said driven part in an axially not-displaceable manner and coupled form-lockingly in a circumferential direction and drives said driven part, said switching member being provided on its outer side with substantially axes-parallel grooves in which said coupling members are received axially movably and form-lockingly in a circumferential direction.

2. A threading apparatus as defined in claim 1; and further comprising a receptacle adapted for receiving a tap, said driven part driving said receptacle.

3. A threading apparatus as defined in claim 1; and further comprising a rotatable direction reversing transmission which is driven by said driving part.

4. A threading apparatus as defined in claim 3, wherein said coupling device includes a second coupling part, said driven part with said switching member and said both coupling parts being axially relatively displaceable so that at least one of said coupling parts with said coupling elements is positionable with said coupling members in said form-locking coupling engagement with said driven part or to a not driven intermediate position, said first coupling part having a driven portion which is connected with said rotary direction reversing transmission and said second coupling part having an output which is connected with said rotary direction reversing transmission.

5. A threading apparatus as defined in claim 1, wherein said coupling device has a second coupling part said driven part with said switching member and said both coupling parts being axially relatively displaceable so that at least one of said coupling parts with said coupling elements is positionable with said coupling members in said form-locking coupling engagement with said driven part or to a not driven intermediate position, said switching member being arranged coaxially to said both coupling parts and axially between said both coupling parts to that said switching member in one axial relative position of said driven part is in an axial position in engagement with said first coupling part, and in another axial relative position of said driven part is in another opposite axial position and in engagement with said second coupling part.

6. A threading apparatus as defined in claim 1, wherein said form-locking coupling device has a second coupling part, said driven part with said switching member and said both coupling parts being axially relatively displaceable so that at least one of said coupling parts with said coupling elements is positionable with said coupling members in said form-locking coupling engagement with said driven part or to a not driven intermediate position.

7. A threading apparatus as defined in claim 1, wherein said switching member is arranged coaxially to at least one coupling part so that said switching member in one axial relative position of said driven part is in an axial position in engagement with said at least one coupling part, and in another axial relative position of said driven part is in said not driven intermediate position.

8. A threading apparatus as defined in claim 1, wherein said switching member is formed as a cylindrical sleeve.

9. A threading apparatus as defined in claim 1, wherein said switching member has three grooves which are spaced from one another in substantially uniform circumferential angular distances.

10. A threading apparatus as defined in claim 9, wherein at least one of said coupling members being arranged in each of said grooves form-lockingly and movably and extends with its part beyond an outer side of said switching member.

11. A threading apparatus as defined in claim 10, wherein said coupling members are formed as balls, said part projecting beyond the outer surface of said switching member being a spherical part.

12. A threading apparatus as defined in claim 9, wherein said grooves of said switching member receive two of said axially spaced coupling members, of which one of said coupling members is a turning-in coupling member and is associated with said first coupling part and is positionable in a form-locking engagement and out of the engagement with said first coupling part, while another of said coupling members is a turning-out coupling member and is associated with said second coupling part and is positionable in a form-locking engagement with and out of engagement from said second coupling part.

13. A threading apparatus as defined in claim 12; and further comprising a spring arranged in an axial region between said two coupling members so as to spring-elastically load said two coupling members in a substantially axis-parallel direction from one another.

14. A threading apparatus as defined in claim 13; and further comprising a ring arranged in said axial region between said two coupling members per each of said coupling members so as to press said spring against a respective one of said coupling members.

15. A threading apparatus as defined in claim 14, wherein said switching member has a radial projection, one of said rings which is associated with said turning-in coupling member being arranged to form-lockingly abut against said radial projection of said switching member and therefore depending on a position of said turning-in coupling member is form-lockingly engageable in said groove at an axial distance from said turning-in coupling member.

16. A threading apparatus as defined in claim 12; and further comprising a projection which separates said two coupling members in said groove of said switching member from one another.

17. A threading apparatus as defined in claim 12, wherein said groove of said switching member has two separate longitudinal groove portions, said two coupling members being arranged respectively in said two longitudinal groove portions.

18. A threading apparatus as defined in claim 17, wherein said coupling members are balls, each of said longitudinal groove portions having a greater axial size than a diameter of said balls.

19. A threading apparatus as defined in claim 17, wherein each of said turning-in coupling member is formed as a ball, one of said longitudinal groove portions in which said turning-in ball is contained has an axial size which is greater than a diameter of said ball by 2-3 times the diameter of said ball.

20. A threading apparatus as defined in claim 19, wherein said axial size of said one longitudinal groove portion is 2.5 times greater than the diameter of said ball.

21. A threading apparatus as defined in claim 17, wherein said turning-out coupling member is a ball, one of said longitudinal groove portions in which said turning-out ball is received has an axial size which is greater than a diameter of said ball by substantially 1-2 times the diameter of the ball.

22. A threading apparatus as defined in claim 21, wherein said axial size of said one longitudinal groove portion is 1.5 times greater than the diameter of said ball.

23. A threading apparatus as defined in claim 1; and further comprising a damping device arranged in the circumferential direction between said switching member and said driven part.

24. A threading apparatus as defined in claim 23, wherein said damping device is spring elastic in both rotary directions.

25. A threading apparatus as defined in claim 23, wherein said damping device has a chamfer which is springy in a circumferential direction.

26. A threading apparatus as defined in claim 23, wherein said damping device has spring elements which are springy in a circumferential direction.

27. A threading apparatus as defined in claim 26, wherein said springy elements are composed of an elastomeric material.

28. A threading apparatus as defined in claim 26, wherein said switching member has drivers and said driven part has drivers, said spring elements being formed as inserts located in a circumferential direction between said drivers of said switching member and said drivers of said driven part.

29. A threading apparatus as defined in claim 28, wherein said spring elements have at least one end which is formed so that said spring elements have a reducing cross-section toward said one end in at least one of an axial direction and a radial direction.

30. A threading apparatus as defined in claim 21, wherein said switching member is formed as a cylindrical sleeve, while said driven part is formed as a spindle.

31. A threading apparatus as defined in claim 29, wherein said drivers are formed as radial projections.

32. A threading apparatus as defined in claim 1; and further comprising a rotatable support part; an abutment provided on one of said driven part and said switching member; and an an axial return spring arranged between said abutment part so that said driven part which is moved under the action of said return spring from said first coupling part in direction toward said second coupling part can be returned with said switching member in an opposite direction.

33. A threading apparatus as defined in claim 12, wherein said first coupling part is formed as a first cylindrical sleeve, and said switching member is formed as a second cylindrical sleeve surrounded by said first cylindrical sleeve, said first cylindrical sleeve having an inner circumferential surface which is provided with an abutting and rolling-off surface for said turning-in coupling member, said first cylindrical sleeve having an axial length substantially corresponding to an axial length of said second cylindrical sleeve.

34. A threading apparatus as defined in claim 12, wherein said first coupling part has coupling elements formed as drivers which are positionable in a form-locking, circumferential driving engagement with said turning-in coupling member and out of the engagement from it, said drivers being arranged on an end region of said first coupling part which faces away of said second coupling part.

35. A threading apparatus as defined in claim 34, wherein said turning-in coupling members are balls, said driver being connected with an end of said first coupling part and extending toward said second coupling part for a short axial distance.

36. A threading apparatus as defined in claim 35, wherein said short axial distance substantially corresponds to a diameter of said turning-in ball.

* * * * *